US008985438B2

(12) United States Patent
Hieronimi (10) Patent No.: US 8,985,438 B2
(45) Date of Patent: Mar. 24, 2015

(54) SYSTEM FOR EVALUATING IDENTIFICATION MARKS AND USE THEREOF

(75) Inventor: Christian Hieronimi, Schwabmünchen (DE)

(73) Assignees: Benedikt Hieronimi, Schwabmünchen (DE); Vincent Hieronimi, Schwabmünchen (DE)

( * ) Notice: Subject to any disclaimer, the term of this patent is extended or adjusted under 35 U.S.C. 154(b) by 0 days.

(21) Appl. No.: 14/116,325

(22) PCT Filed: Apr. 26, 2012

(86) PCT No.: PCT/EP2012/057630
§ 371 (c)(1),
(2), (4) Date: Nov. 7, 2013

(87) PCT Pub. No.: WO2012/152592
PCT Pub. Date: Nov. 15, 2012

(65) Prior Publication Data
US 2014/0091140 A1    Apr. 3, 2014

(30) Foreign Application Priority Data
May 7, 2011    (DE) .......................... 10 2011 050 201

(51) Int. Cl.
*G06F 17/00*    (2006.01)
*G06K 7/14*    (2006.01)
*G01S 5/16*    (2006.01)

(52) U.S. Cl.
CPC .. *G06K 7/146* (2013.01); *G01S 5/16* (2013.01)
USPC .......................................... 235/375; 235/385

(58) Field of Classification Search
USPC ...................... 235/375, 385, 462.13
See application file for complete search history.

(56) References Cited

U.S. PATENT DOCUMENTS 6,506,342 B1 *    1/2003    Frankel ........................... 506/31
8,488,842 B2 *    7/2013    Wood et al. ................... 382/103
(Continued)

FOREIGN PATENT DOCUMENTS

| EP | 0 813 073 A2 | 12/1997 |
| WO | 03/044734 A2 | 5/2003 |
| WO | 2005/076033 A1 | 8/2005 |

(Continued)

OTHER PUBLICATIONS

International Search Report; PCT/EP2012/057630; mailed Aug. 9, 2012.

*Primary Examiner* — Daniel St Cyr
(74) *Attorney, Agent, or Firm* — Kilpatrick Townsend & Stockton LLP (57) ABSTRACT

The identifier and position and/or location of at least one identification mark is identified by a first optical recording device that is designed so that spatial position and/or location of an identification mark can be detected by the first optical recording device. A second optical recording device is designed so that it can scan a plan projection of at least a part of the measurement volume of the first optical recording device in a spatially resolved manner. Transformation information allows the definition of a region of interest (ROI) in the spatially resolved information about the scanned projection. The ROI is searched for the presence and type of identifier information to determine the identifier of the detected identification mark.

19 Claims, 4 Drawing Sheets

(56) References Cited

U.S. PATENT DOCUMENTS

2009/0015663 A1* 1/2009 Doettling et al. .............. 348/46
2011/0024500 A1 2/2011 McReynolds et al.

FOREIGN PATENT DOCUMENTS

WO 2006/030444 A2 3/2006
WO 2006/115958 A1 11/2006

* cited by examiner

SYSTEM FOR EVALUATING IDENTIFICATION MARKS AND USE THEREOF

The present invention relates to the technology of detecting and evaluating identification marks. In particular, the invention relates to a system for detecting the position as well as the identity of identification marks, respective identification marks as well as uses of the system and the identification marks.

Identification marks are known in prior art, inter alia in the form of optical markers or tags, respectively. Such markers or tags, respectively, are already much used both in production, such as for tracking parts, and/or for machine control.

Optical tags, for example in the form of bar code tags, are predominantly used for identification of goods to which they are attached. This is generally done by reading the tag, where the information read allows for biunique association of the tag with the goods and vice versa, due to a mapping previously stored in an external system.

It has shown for these known systems, in particular when a plurality of tags is present within a space, that merely reading the information of tags (hereinafter also the identifier of the tags) is sometimes insufficient. Rather, information about the localization of the tags within the space is also desired and, in particular, specific mapping of the spatial localization of a tag with the information it bears (identifier).

WO 2006/030444 A2 and WO 03/044734 A2 disclose systems for tracking an object, in particular of markers within a closed space with several optical recording devices. EP 0 813 073 A2 discloses a system for determining the position of a plurality of infrared markers.

It is therefore an object of the invention to provide a system for detecting and evaluating identification marks which improves known systems at least in part, and where, in particular, in addition to the position of an identification mark, also its identifier can be detected. It is a further object of the invention to provide suitable tags for such systems.

These and other objects are satisfied by a system for detecting the identifier and the position and/or location of at least one identification mark.

According thereto, a system for detecting the identifier and the position of at least one identification mark comprises at least one first optical recording device being adapted such that, by means of said first optical recording device, the spatial position of at least one identification mark being arranged inside the measurement volume of the first optical recording device can be detected, and at least one data processing means is at least indirectly connected to the first optical recording device and receives data transmitted therefrom regarding the spatial position of the detected identification mark.

According to the invention, the system also comprises at least one second optical recording device being adapted such that, by means of said second optical recording device, a plan projection of at least part of the measurement volume of the first optical recording device can be scanned in a spatially resolved manner, where the at least one data processing means is at least indirectly connected to the second optical recording device and receives spatially resolved information transmitted therefrom regarding the scanned projection. The at least one data processing means has transformation information available that allows the definition of a region of interest (ROI) in the spatially resolved information regarding the scanned projection, and where the ROI is searched for the presence and the type of identifier information in order to determine therefrom the identifier of the detected identification mark.

Preferably the spatially resolved information regarding the scanned projection is digital image information. At least one area is preferably defined within this information, i.e. a ROI, which is then further edited and/or processed by means of suitable digital image processing operations such as filtering, contrast enhancement, subtraction, summation and/or quotient formation, color shifting, color analysis, pattern recognition and the like. This editing or processing, respectively, then shows whether identifier information is given within the ROI and, if this is the case, which identifier this is.

Spatially scanning optical recording devices are, due to their field of application, usually designed to detect with high accuracy the spatial position of identification marks frequently comprising retroreflective elements. Other features of identification marks, such as the shape or color of identification features of the identification marks, however, can frequently be detected very poorly due to the design of these systems, i.e. with high uncertainty, or not at all.

The system according to the invention presently provides relief as it provides an optimized optical system for the purpose of detecting the identification features of the identification marks by means of the second optical recording device, where according to the invention, the information determined by the first optical recording device, i.e. data about positions of identification marks, is used to improve the recognition accuracy and recognition security of the second optical recording device, which determines the identifier of the identification marks.

In one embodiment of the invention, the at least one first optical recording device is a stereoscopic camera operating in the infrared spectral range, and the at least one second optical recording device is a CCD or CMOS camera operating in the visible spectral range and preferably having a very high resolution.

According to the invention, this is done in that the position information received according to the invention from the first recording device, by applying a transformation based on the transformation information, leads to a determination of the location, at which position or at which location within the spatially resolved information about the scanned plan projection, which is recorded by the second optical recording device, the identifier information of this identification mark is available. In the area of this location, a region of interest (ROI) is then defined, and the ROI is analyzed for the presence and the type of identifier information, in order to therefrom determine the identifier of the detected identification mark.

In the course of processing the spatially resolved information regarding the scanned plan projection, which is recorded by the second optical recording device, preferably prior to the image analysis, a restriction of the field of view is performed, e.g. by digital image processing operations, within which such image analysis is at all performed. Due to this kind of "restriction" of the analysis to the ROI within the spatially resolved information regarding the scanned plan projection, i.e. preferably to the digital image information, there is a considerable reduction of the computational effort in the digital processing of this information and simultaneously a significant increase of detection accuracy and/or sensitivity and in particular of the recording speed.

In the system according to the invention, a data structure is additionally provided in a first memory device connected to the at least one data processing means, that at least partially comprises a virtual representation of the space spanned by the measurement volume of the first optical recording device, where the virtual representation comprises information about the target position of at least one identification mark and at least one associated identifier, and the at least one data processing means performs a comparison between the actual position of an identification mark and the target position of an identification mark within the virtual representation as well as a comparison of the determined identifier of the detected identification mark with the identifier stored within the data structure of the corresponding identification mark. As a result of the comparison, the data processing means then outputs a signal representing a "match" or "no match", which represents the respective comparison result.

A system according to the invention thus designed has the advantage, that it can not only detect merely the spatial position of an identification mark in relation to the first optical recording device, but it also provides in particular the possibility to absolutely determine the position of at least one identification mark (actual position) in a virtual representation of the space spanned by the measurement volume of the first optical device, and to relate it a position (target position) of the respective identification mark stored with the virtual representation.

The target position within the virtual representation was preferably determined either by one or more such definitions of positions being directly defined in the virtual representation together with identifiers, or by measuring at least one predefined object having respective identification marks attached to it at predefined locations and/or in predefined patterns, and recording of the positions and identifiers of the identification marks thus determined and their registration as target positions in the virtual representation.

The virtual representation therefore preferably represents a virtual representation of at least a part of the volume measured by the first recording device, into which all the detected position and/or identifier information is transponed, and in which further processing of the data obtained can be performed in a simple manner.

Particularly preferably, the transformation information is adapted such that, due to the application of the transformation information to the information regarding the spatial position of an identification mark, as it is determined by the first optical recording device, a localization of the same identification mark occurs in the plan projection, wherein, based on this localization, the definition of the ROI is performed in the spatially resolved information regarding the scanned projection.

By means of the transformation information, at least part of the measurement volume is quasi mapped onto the plan projection of the latter, but preferably in the domain of the second optical recording device, i.e. quasi from its perspective. Suitable transformation information, for example, has the form of a matrix, possibly a complex-valued matrix with which a symbolic transformation of the detected position information could possibly be performed, or of a possibly multidimensional numerical number field, which can then be used for numerical transformation—possibly comprising inter- or extrapolations.

As an example of this matrix transformation, multiplication of a space vector with a suitable matrix of the dimension m×n may only be presently mentioned, from which a plane vector then results whose values indicate the localization of the same identification mark in the plan projection.

In a further embodiment, which is applicable separately and/or additionally, there is an option to determine and/or to calibrate transformation information and possibly also verify it in the determination of the position of at least one identification mark by the first optical recording device or its identifier by the second optical recording device, respectively, and relating the position information with the information regarding the localization of the identifier within the plan projection. To simplify this process, the ROI can, for processing by the at least one data processing means by the user, who performs the creation, calibration or verification of the transformation information, be determined manually or semi-automatically.

For calibration purposes, also a stationary identification mark can be used, where the position and the identifier of this identification mark are in the virtual representation preferably already defined during the creation or installation of the system and possibly marked as inalterable.

In this manner, continuous recalibration is also possible, or at least permanent control, that the initial or a subsequent calibration is still reliably correct, because any deviation of the determined information regarding the position of the stationary information tags from the localization of the identifier associated therewith within the plan projection can lead to a respective error message. It is advantageous for this, to also store the localization information of the respective identifier information of the identification mark(s), possibly marked as inalterable, in the data structure of the virtual representation.

In a particularly preferred embodiment, the at least one data processing means is mobile, and in particular a portable data processing means, preferably a portable computer (laptop), a tablet computer, a smart device or the like. This allows easy working with the system according to the invention, in particular in applications in which repositioning of an identification mark occurs or can occur until the data processing means outputs the result of the comparison between the actual position and the target position as being a "match".

In a particularly preferred embodiment of the present invention, the first data processing means comprises a plurality of interacting data processing means, where data communication between the plurality of data processing means is effected preferably by means of optical, radio or wireless data connections. In this, in particular interaction of a stationary data processing means with a mobile data processing means can be advantageous, especially when large volumes of data are to be processed or to be stored in the context of data processing, and therefore, due to the limited capacity of a portable data processing means in terms of computing power and/or storage capacity, performance loss in processing is to be feared. The mobile data processing means could in this case at least partially be a kind of one input/output unit for the stationary data processing means.

Moreover, cooperative interaction of several data processing means, between which data communication occurs, can of course be used also for applications in which determination of the actual position and identifier according to the invention occurs at a place being entirely different from that of the output of the comparison, wherein, to this end, the distance of the places is irrelevant, since, after measuring the identification marks in the real space and transmitting the measurement values into the virtual space, any further processing can only take place in the virtual space, where this processing may be performed at any place on the basis of known data transmission methods and means. For example, such a feedback could occur for re-positioning of individuals or objects or also for controlling a remote-controlled movement.

In a preferred embodiment of the present invention, the at least one data processing means, or a data processing means connected to it, comprises a display device outputting a graphic representation of the actual position of the at least one identification mark, the target position of the at least one identification mark and/or the virtual representation.

Preferably, the display device is mounted well visible to a user, such as on a wall of a room, and/or displaying is effected by a display device of the mobile data processing means.

Alternatively or additionally thereto, it can be provided to have the display be effected by video or laser projection, wherein for example, the target and actual positions of the identification marks are indicated by selective illumination of an object or of a human. Further alternatively or additionally to the previous display devices, a user-portable display device can be provided which is mounted, for example, in the form of a pair of glasses performing an image projection of the display onto the retina of the user.

The graphical output of the actual and/or target position, as well as possibly of the virtual representation, allows, for example, a present user of the system to recognize, to what extent and in what manner repositioning and/or rearrangement of the identification marks must be performed in order for the data processing means, as a result of the comparison between the actual position and the target position of this identification mark, to output a "match".

In a preferred embodiment of the present invention, in the event that the data processing means, as a result of the comparison of the target with the actual position of the at least one identification mark, outputs a signal for further processing representing "no match", a displacement vector is formed in the virtual representation between the actual position and the target position of the at least one identification mark, and preferably displayed together with the virtual representation by means of the display device. In this way, it is particularly easy for a user of the system to detect by which kind of rearrangement or displacement all actual positions can be matched with the respective target positions of preferably a plurality of identification marks within the accuracy required for the positioning. After or during displacement or rearrangement, respectively, the position of the identification marks and possibly the representation for the user is then adapted in order to receive an appropriate response to the displacement or rearrangement respectively performed.

Particularly preferably, the possibly continuously determined displacement vector additionally serves as the basis for controlling at least one actuator element, in order to automatically and without any manual intervention by the user bring the at least one identification mark into its target position. This may occur possibly subject to the required positioning accuracy of individual identification marks, in particular when using several identification marks in cases with a variety of degrees of freedom. In this manner, it is possible with the system according to the invention to obtain not only a control function for repositioning at least one identification mark, but beyond that, automatic generation or correction, respectively, of the positioning of at least one identification mark.

In the case of one and the same application situation, it is in this way also possible to sequentially "run through" a plurality of target positions of at least one identification mark, in that every time when the data processing means outputs a "match" between the target and the actual position for the at least one identification mark, a new (or the next) target position for this identification mark is positioned in the virtual representation and, based thereupon, a displacement vector is determined. This displacement vector can then serve as a basis for controlling automatic displacement of the at least one identification mark by at least one actuator element. In this manner, sometimes very complex trajectories of an identification mark can be "swept", which of course also means that the objects on which the respective identification mark or tags are disposed are guided substantially along the same trajectory.

In a further preferred embodiment of the present invention, graphical output of the comparison result occurs on the display device or devices, for example, in the form that the comparison result is at least partially outputted in the form of a color-coded image output such as a green field or a red field, by outputting text result messages, such as "OK" or "FAIL", respectively, when the data processing means outputs a signal representing a "match" or "no match" as the comparison result. Particularly preferably, this way, a simple and quick visually detectable information regarding the matching of the target with the actual positions of individual or all identification marks can be integrated into the graphic display, in that, for example, the target and actual positions of the identification marks are displayed as dots within the graphically rendered virtual representation, where the dot for a "match" is marked in green and for "no match" in red. This shows the user in a visually detectable quick and reliable manner when the actual position of the at least one identification mark differs from the target position.

In addition to or instead of the graphical output of the comparison result, voice output can also occur and preferably a release or a lock of at least an interlock, preferably at least a software interlock, by which other processes can possibly be triggered and/or controlled. For example, a system according to the invention can be installed such that, only after a match of the target with the actual positions of certain predetermined or all identification marks, a relay is actuated switching on the power supply for other systems or devices. In this manner, it can be ensured for a variety of applications, that without proper positioning and/or repositioning of some or all identification marks, no further processes are executed, which due to incorrect positioning could possibly bear consequences in causing damage and/or being dangerous. Such applications are discussed by way of example farther below in the context of the detailed description.

In addition, by means of the identifier information associated with the identification mark, it can be also be ensured that there is no confusion of different identification marks, thereby incorrectly displaying a "match" or even releasing an interlock.

In one embodiment of the invention, the virtual representation comprises information on the required accuracy of the position match of the at least one identification mark, where, in particular, respective information on the required accuracy of the position match between the target and the actual position of an identification mark is delivered in combination with the target position of the at least one identification mark with the respectively predefined identifier, preferably within the virtual representation. Alternatively, the information regarding the required accuracy of the position match between the target and the actual position of an identification mark can also be stored independently of the virtual representation, where, by means of the respective, preferably unique identifier of the identification mark, unique allocation of the "matching accuracy" of the position match to the respective identification marks of the virtual representation can be established.

Preferably, the data processing means, as a result of the comparison of the target to the actual position of the at least one identification mark, outputs a signal representing a "match" or "no match" for further processing, if the actual position of at least one identification mark matches its target position in the virtual representation within the required accuracy specified. In this manner, the signals representing a "match" or "no match", respectively, are then in the embodiments of the invention processed as described above but also as described farther below, in particular, graphic output of such a match can occur, a release of interlocks and the like, if a "match" is detected by the system within the "matching accuracy" defined for one or more identification marks.

In this manner it is possible, that a kind of different weighting of the accuracies of the position match for different identification marks is performed such that, for example, from a plurality of identification marks, the match of the target to the actual position of an identification mark must be particularly precise, whereas for other identification marks, a position match being less accurate is sufficient. Thereby, "matching accuracies" of the entire arrangement of identification marks are possible, tailored to the respective application of the system according to the invention.

In a preferred embodiment of the present invention, the at least one data processing means and/or further data processing means connected to it, such as a mobile data processing means, comprises at least one external and/or internal image recording device. The external or internal image recording device is preferably also a CCD or CMOS camera, and preferably a video camera or a high-resolution video camera.

In one embodiment of the present invention, the external and/or internal image recording device is the second optical recording device, where in this case, the transformation information depends on the position or orientation, respectively, of the image recording device. The transformation information is in particular preferably subjected to a further transformation depending on the position or orientation, respectively, of the image recording device, in order to thereby apply the transformation information respectively correctly matched to the specific position of the image recording device to the position information determined by the first optic recording device, by means of which the definition of a region of interest (ROI) is correctly enabled in the spatially resolved information regarding the scanned projection, depending on the orientation and the distance from which the image recording device "looks" upon the measurement volume of the first optical recording device—and therefore also, how the plan parallel projection in the scanning plane of the image recording device or the second optical recording device is configured, respectively.

For example, a mobile data processing means itself can perform a determination of a position determination and/or change which is in one embodiment measured by sensors provided in the mobile data processing means. In a further embodiment, a position determination and/or change can be determined by the external measurement of the position of the mobile data processing means and transmitted thereto.

In a particularly preferred embodiment, the image recording device is, during creation and/or processing of the virtual representation and/or the application of the system, used to record images, for example, for guiding and/or control purposes. It is preferably also envisaged, that images recorded by the image recording device are displayed on the display device or devices of the first and/or further data processing means.

More preferably, at least one image recorded by the external and/or integrated image recording device is stored in the memory device together with or in connection to the virtual representation, preferably during generation of the latter. In connection with displaying the virtual representation, the recorded image can then be displayed on at least one display device, so that a possible deviation of the arrangement of components, individuals and/or other objects can be easily visually perceived and corrected.

Preferably, the at least one image recorded by the image recording device is subjected to image processing prior to being stored, in particular to contrast enhancement, segmentation, edge detection, subtraction and the like, where contours in the recording situation possibly existing during creation of the virtual representation can be enhanced, thereby achieving improvement of the visual perception during rendition.

Particularly preferably, the image recorded and/or stored by the recording device is displayed together with the actual position, the target position and/or the virtual representation. This can be done, for example, by displaying a kind of so-called "augmented reality", in which a video image recorded live by the image recording device is superimposed with graphical elements indicating the target and/or actual positions of the identification marks and/or the virtual representation.

In this embodiment of the present invention, performance of the system according to the invention comes into its own, especially when the at least one first data processing means is a mobile data processing means comprising an integrated image recording device. By detecting the position of the mobile data processing means, its camera angle can be determined in relation to both the measurement volume as well as the virtual representation and the respectively stored target position of the at least one identification mark and be superimposed onto the video image, recorded by the image recording device, in the correct position and perspective. Likewise, the actual position of the at least one identification mark measured by the system can be detected and superimposed in the correct position and perspective onto the video image recorded by the image recording device and in addition, also graphical or text markings signaling a "match" or "no match".

Any movement of the mobile data processing means is in turn detected by the system and results in recalculation of the superimposed information, so that there is again a correct display of the virtual representation in terms of orientation and perspective in relation to the new position of the mobile data processing means within or above the video image. Such recalculation or correction of the representation is preferably performed live so that the user when viewing the display device always receives easily comprehensibly and complete information respectively correctly complementing the perspective of the video image chosen by him (by means of the video camera).

A similar functionality, however, can also be obtained with stationarily arranged image recording devices, although this focuses on having the image recorded and stored by the image recording device is superimposed on the live image, preferably next to the other information about the position, or the "match" or "no match", so that the operator receives an easily comprehendible "instruction", how he can again reproduce the recorded situation in the creation of the virtual representation, preferably by coarse arrangement by superimposition of the recorded images and by subsequent fine adjustment by re-positioning and location, until the system outputs a signal for all identification marks representing a "match" and, if applicable, releases an interlock.

In a particularly preferred embodiment, the target and/or actual positions, and the virtual representation and possibly also the graphical representation of a "match" or "no mach", respectively, each preferably being three-dimensional information (3D-information), in observance of the perspectives of the image recording device, which in the case of a mobile data processing means can be determined by means of its position, are displayed as a projection into a display area of the display device of the at least one data processing means in order to thus provide the viewer of the display device with a representation via the display device that displays the situation perspectively accurately and spatially correct. Such a projection of 3D-information in the display area while observing the perspective of the viewer of the display device is known, for example, from ray-tracing technology and, in a manner possibly adapted to the situation of application, can be used for the present invention.

Such a projection of all 3D-information in the display area with simultaneous superimposition of a live image recorded by an image recording device allows the user of the system according to the invention both accurate visual perception and restoration of a recorded situation, which, however, can at the same time by the virtual representation and the definitions established therein of the target positions of the identification marks, be verified in an automated and highly accurate manner.

The system according to the invention is used in a variety of applications, in particular in those applications where accurate reproduction of positioning objects and/or humans is required. In particular, a system according the present invention is used in controlling the positioning of a plurality of identification marks relative to each other and/or absolute within the virtual representation, where the identification marks are arranged in particular on one or more objects and/or on humans. Particularly preferably, the system according to the invention is used for reproducing the arrangement of identification marks after the loss of the relative position to each other and/or the absolute position in relation to the virtual representation, in particular for repositioning a human and/or objects relative to a human.

An identification mark according to the present invention, and as it is advantageously used with a system according to the present invention, comprises a flexible substrate, which is preferably made of bio-compatible plastic. Moreover, the substrate of the identification mark is according to the present invention preferably made from foamed or extruded bio-compatible plastic. Preferred lengths and widths of the preferably two-dimensional substrate are in the range of centimeters and decimeters; preferred thicknesses in the range of micro- and millimeters.

The identification mark according to the present invention comprises an optical retroreflective element preferably disposed on a surface of the substrate and being preferably circular, triangular or rectangular in shape, but can also have any other geometric shape. The retroreflective element is preferably optimized for use in the range of the near-infrared and/or infrared spectrum.

According to the invention, the identification mark according to the present invention also comprises an optical signal-modulating element arranged on a surface of the substrate. The retroreflective element and the signal-modulating element are located preferably on the same surface of the substrate. The signal-modulating element is preferably optimized for use in the visible spectrum and is embodied preferably in a circular, linear or annular, triangular, quadrangular or polygonal continuous or discontinuous and/or single- or multi-colored manner. The signal-modulating element is in particular configured such that there is most efficient and clearly measurable modulation of an incoming or outgoing signal at the respective wavelength.

In a preferred embodiment of the identification mark according to the present invention, the identification mark comprises adhesive on the surface opposite to the retroreflective and the signal-modulating surface and is preferably coated with it. Preferably, the adhesive is also bio-compatible and in particular suitable to remain on the human skin for an extended period of days or weeks.

In one embodiment of the identification mark according to the present invention, the signal-modulating element is designed such that it modulates and/or diffracts the incident optical signal or incident optical radiation. The optical signal thus modulated can then in turn be detected by an optical recording device which is equipped for recording such modulated optical signals. This is therefore a passive variant of optical modulation of the incoming optical signal.

In one further embodiment of the identification mark according to the present invention, the signal-modulating element is designed such that it emits modulated optical radiation. The optical signal thus modulated can then likewise be detected by an optical recording device which is equipped for recording such modulated optical radiation. This is therefore an active variant of optical modulation of the emitted optical signal. Such signal-modulating elements can be, for example, light-emitting diodes and preferably organic light-emitting diodes which are applied to a planar region of the surface of the identification mark.

Preferably the identification marks of the present invention additionally comprise a circuit with an antenna enabling wireless read-out of a memory of the circuit. Such circuits are known in prior art and are used in so-called RFID tags (Radio Frequency Identification). By combining both optical and RF-scannable identifiers in these identification marks, there is also the possibility to perform further identification and/or grouping of the identification marks and to detect in particular identification marks that are located outside of the measurement volume of the first optical recording device. In such a case, for example, a respective notice can be outputted to the display device of the data processing means.

In the context of the following detailed description, merely a particular case of use of the present invention shall be explained in detail. Restrictions of the very general teaching of the present invention, which has been presented above and which additionally is apparent therefrom to the person skilled in the art, however, are expressly not intended by these descriptions of individual embodiments.

The features and advantages of the present invention result at least partly also from the following detailed description of various embodiments of the invention in combination with the drawings and the claims.

Figure 1:
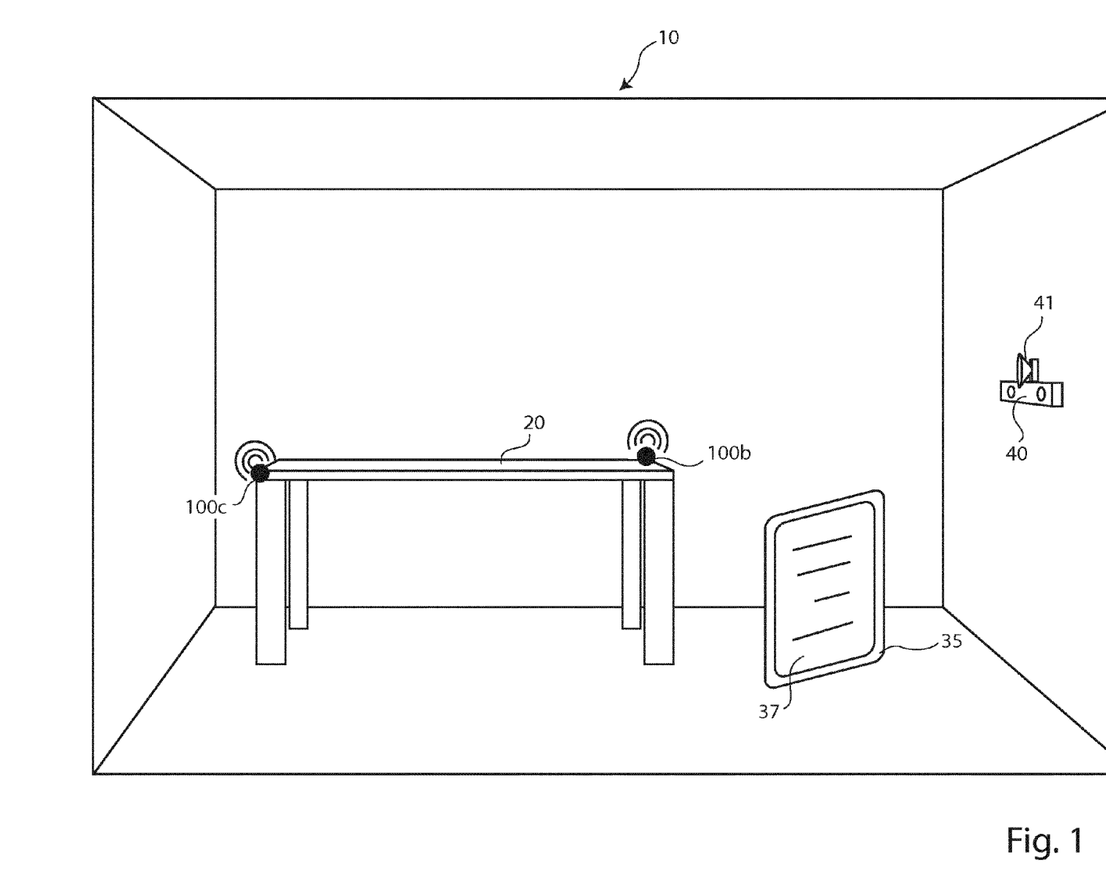
FIG. 1 shows a schematic representation of a first embodiment of the present invention in a first general situation of application.

FIG. 1 shows a schematic representation of a first embodiment of the present invention by way of example in a first general situation of application. In a (real) space 10, an object 20 is arranged, which at two points, in the example of FIG. 1 being located at its opposite corners, is provided with identification marks 100b, 100c. In this example, these are identification marks 100 of the passive variant, for example, being designed to be self-adhesive, making easy attachment possible. All identification marks in the present embodiment comprise an individual identifier 120 in the form of a segmented ring of different colors (cf. also FIG. 3b), which is attached around a retro-reflector 110, so that any confusion of the identification marks is not possible.

Within the space 10, a first optical recording device in the form of a stereoscopic camera 40 is mounted, the measurement volume of which covers a majority of the space 10. The stereoscopic camera 40 is connected to the data processing means 35 by means of a suitable communication connection, such as infrared, WLAN or the like, so that the data processing means 35 receives from the stereoscopic camera 40 position information of the retro-reflectors 110 being applied on the identification marks 100b, 100c. The data processing means 35 comprises a graphic display device 37, with which visual information is presented to a user. Preferably, the data processing means 35 is of the mobile kind, for example, a tablet computer.

In the embodiment shown, the identification marks 100b, 100c are embodied in such a manner that they reflect the light emitted from the infrared light sources mounted on the stereoscopic camera 40 by means of the retroreflector 110 back in the direction of the stereoscopic camera 40. In this manner, the stereoscopic camera 40 can in a known manner perform precise localization and possibly also determine the location of the identification marks 100b, 100c. The information regarding the positions of the identification marks 100b, 100c is transmitted to the data processing means 35.

In addition to the stereoscopic camera 40, a second optical recording device is provided in the form of a high-resolution CCD video camera which by upstream optics is mapped a plan projection on the CCD of the essentially entire measurement volume of the stereoscopic camera. The CCD video camera thereby detects the individual identifiers provided on the identification marks, where this identifier information is available at locations of the recorded or scanned image information, which is dependent inter alia on the position in space and in particular the distance of the identification mark from the CCD video camera.

The image information recorded by the CCD element is also transmitted to the data processing means 35. Based on the transformation information stored in the data processing means, the position or the localization of the identifier information, respectively, is then determined based on the position information determined by the stereoscopic camera using the transformation information in the plan projection and thus also of the image information. This region of the image information is therefore searched for the presence of identifier information and the recognized identifiers are determined.

Subsequently, a comparison of the position information determined by the stereoscopic camera as well as the identifier information determined on this basis using the transformation information from the image information with the target positions of the respective "virtual" identification marks provided in a virtual representation of this situation is subsequently performed, where a match of the identifiers stored in the virtual representation with the determined identifiers is also performed, and thereafter, if a match of all parameters is detected, then a signal representing a "match" is outputted. The comparison of the information preferably takes place for all recorded identification marks in the same way.

Figure 2:
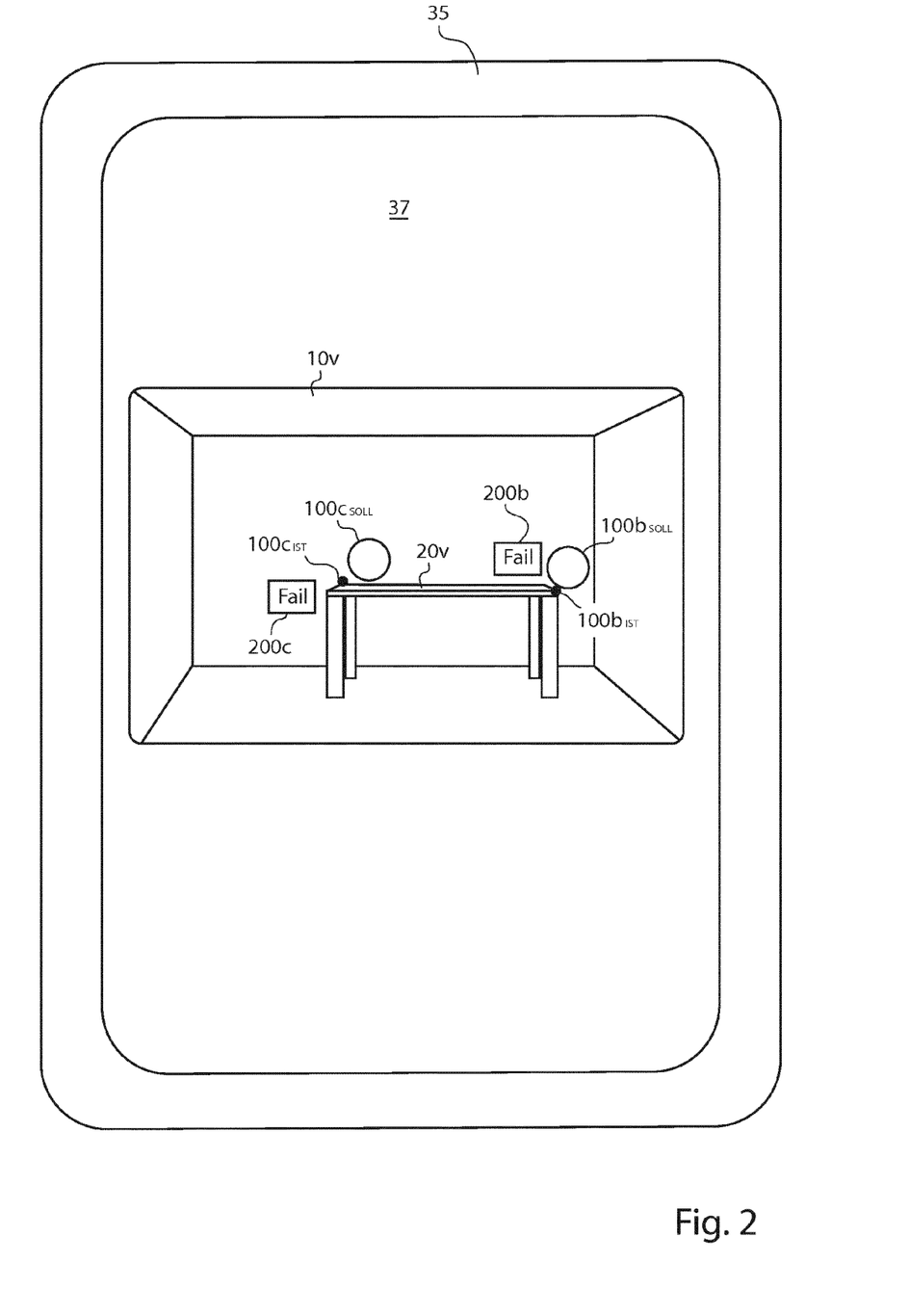
FIG. 2 shows a schematic representation of a display of the display device of the first data processing means according to FIG. 1.

The situation of application and the function of the embodiment of the invention presently shown shall now be described with reference to FIG. 2 and, where necessary, to FIG. 1. FIG. 2 shows the image displayed on the graphical display device 37 of the mobile data processing means 35, at least partially. In this, the displayed image represents a virtual representation of the situation, where the space 10v corresponds to the real space 10 and the schematized object 20v corresponds to the real object 20.

The virtual representation displayed by the display means 37 of the mobile data processing means 35 also shows the actual positions $100b_{IST}$ and $100c_{IST}$ of the identification marks 100b, 100c within the virtual representation, shown here as solid dots, determined by the system on the basis of the determination of the position of the stereoscopic camera 40.

In addition, the target positions $100b_{SOLL}$ and $100c_{SOLL}$ of the respective markers 100b, 100c stored within or in relation to the virtual representation in the memory device are illustrated, presently as transparent circles.

As can be seen, there is no match between the actual position $100b_{IST}$, $100c_{IST}$ of the two markers 100b and 100c and their target position $100b_{IST}$, $100c_{IST}$, which is displayed by the text display "FAIL" 200b, 200c. As a result, the viewer of the display device can in this embodiment therefore directly recognize that the position of the object 20 in relation to its target position, which results from the target positions $100b_{SOLL}$, $100c_{SOLL}$, is placed incorrectly, and can perform displacement or relocation of the object 20, respectively, based on the representation of the display device for so long until a "match" is displayed for the markers 200b and 200c, i.e. an "OK".

In this, any likelihood of confusing, for example, the markers 100b and 100c, is excluded due to the individual identifiers of the markers 100b, 100d, which are preferably recorded both together with their positions as well as preferably stored within the virtual representation, so that faulty placement of the object 20 can be detected by the system and certainly can be shown within the virtual representation, even if the position of the object 20 seems to be correct in real space, for example, due to object symmetry.

Alternatively to the text displays 200a, 200c, also color variations of the respective icons can be displayed for each pair consisting of the target positions $100b_{SOLL}$, $100c_{SOLL}$ and the actual positions $100b_{IST}$, $100c_{IST}$, so that, for example, the icons for the matching target and actual positions of the marker have a green color, and the ones for the non-matching target and actual positions have a red color.

Figure 3:
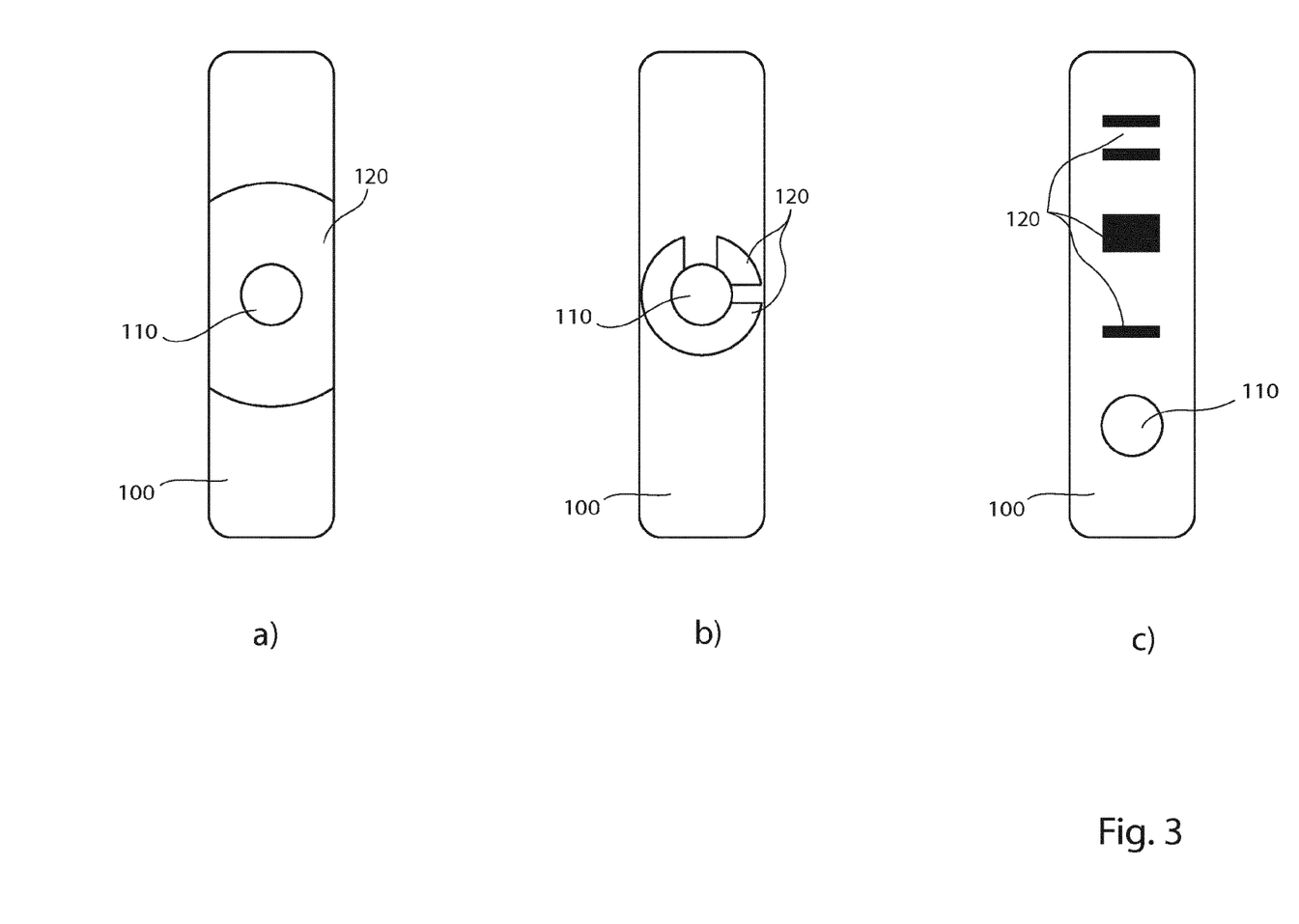
FIG. 3 shows a schematic representation of identification marks according to the present invention.

FIGS. 3a to 3c show embodiments of identification marks 100 according to the present invention. According thereto, the identification marks 100 comprise a substantially rectangular substrate, on the—shown—top side of which a retroreflective element 110 is mounted in the shape of a circle. In the case of FIG. 3a, the retroreflective element 110 is substantially concentrically surrounded by an identifier ring 120, where the identifier ring in this embodiment has a color differing in dependency of the identifier. By means of the color of the identifier ring 120, for example, the identification mark 100 can be allocated to one of a plurality of groups of identification marks.

FIG. 3b shows a variant similar to FIG. 3a, where the identifier presently does not exist in the form of the coloring of the identifier ring, but rather in the design and orientation of circular segments 120 which are in turn arranged substantially concentrically around the retroreflective element 110. By means of the allocation of the circular elements 120 and their specific design, the identification mark 100 can again be allocated to one of a plurality of groups of identification marks.

Finally, FIG. 3c shows a variant of an identification mark 100 in which, in addition to the retroreflective element 110, identifier bars 120 of different geometry are arranged at different distances. Depending on the embodiment, there is also the option that the different bars are also colored differently. It is at this point not difficult to recognize the amount of different identifiers achievable by the large number of possible combinations which are additionally ideally suited for being respectively recorded by the second recording device embodied according to the invention.

A further embodiment and situation of application of the present invention shall now be described with reference to FIG. 4. This is an application in the field of radiation therapy, in which exact positioning of a patient as well as the matching all relevant treatment parameters to the treatment situation is of utmost importance.

Figure 4:
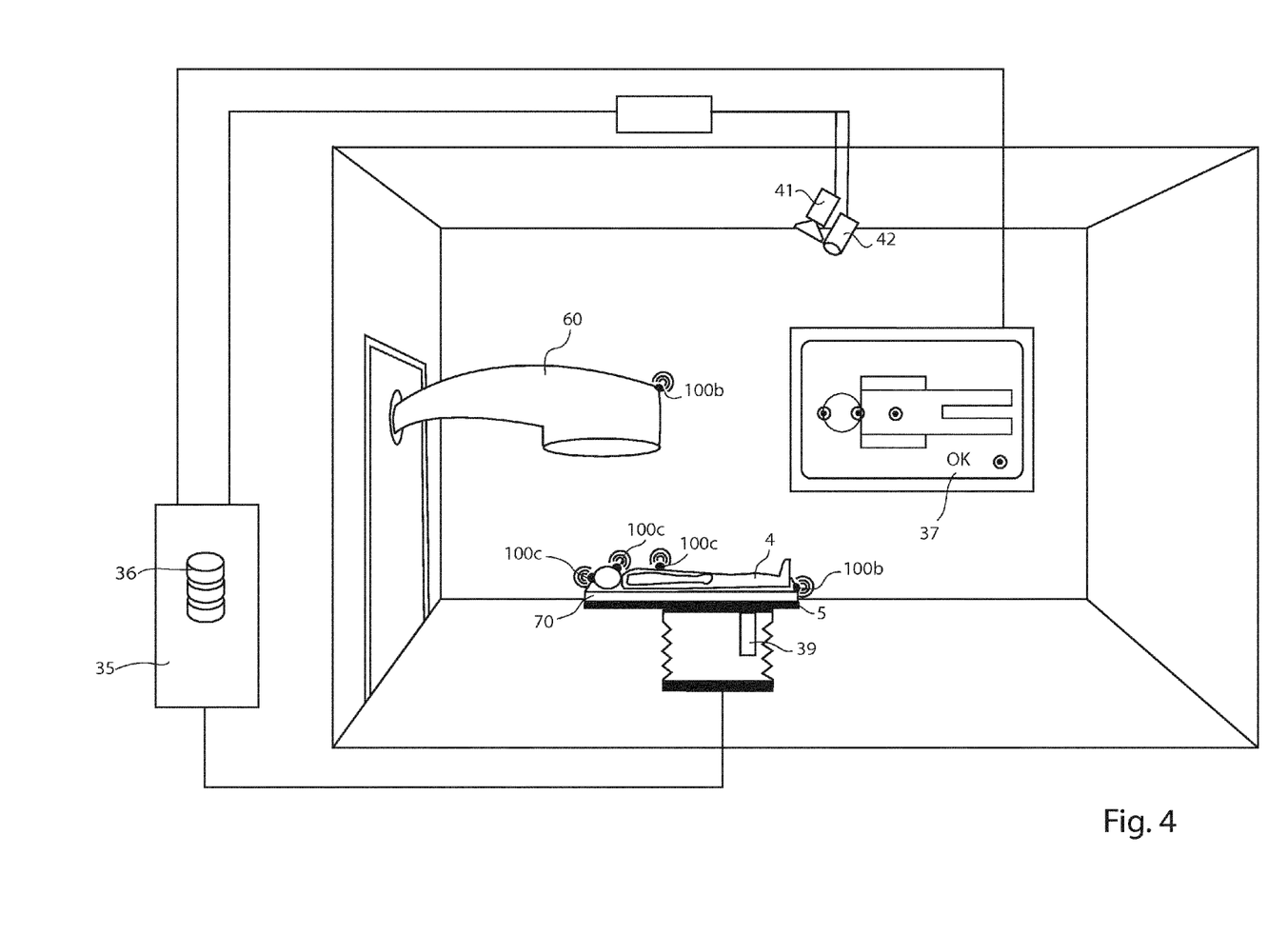
FIG. 4 shows a schematic representation of a further embodiment of the present invention in a further situation of application.

FIG. 4 schematically shows preparation of the patient's treatment in a treatment room for ion beam irradiation. In this, the patient 4 is in a lying manner supported on a treatment table 5 displaceable in all directions of the room and on a patient-specific immobilization means 70 in the form of a vacuum pad, where the isocenter of the radiation is below the gantry 60 and presently within the patient's head. Within the treatment room, first and second recording devices 40, 41 are positioned above the treatment table 5 at the ceiling. The recording devices 40, 41 are connected to a data processing means 35, preferably arranged outside of the treatment room. The data processing means comprises a memory device 36 comprising a data structure that represents a virtual representation of at least parts of the previously described components of the treatment room and the patient. A display device 37 is additionally connected with the data processing means 35.

As already described several times and in detail, the first and second recording devices 40, 41 determine the positions of the identification marks 100b, 100c distributed in the treatment room as well as their identifiers, and a comparison is performed with the stored positions of the identification marks with the respective identifiers in the virtual representation.

A graphic representation of the virtual representation is shown well visible for the operator staff on the display device 37, where, as seen in FIG. 4, also the arrangement of the identification marks 100b, 100c as well as the patient 4 on the vacuum pad 70 is shown. Further objects used for radiation treatment, however, for reasons of clarity and simplicity presently not mentioned, such as a support mat, a breast board and the like, can in the same manner be included in the detection and the display within the virtual representation.

By means of the system according to the invention, the patient 4, having been marked in a preliminary examination, for example, with adhesive identification marks bearing unique identifiers at easily accessible locations, can be repositioned lying in exactly the position that he was in during the preliminary examination/adjustment or during previous treatment sessions. As part of the preliminary examination, an individual virtual representation of the treatment situation is created for each patient to whom both the positions of the identification marks on the patient as well as those of the vacuum pad 70 and the gantry 60 are added as target positions with their respective individual identifier. Furthermore, during the preliminary examination or set up, an image of the patient is recorded by the video camera 40 in the correct position and also added to the virtual representation.

By means of the individual identifiers of the identification marks on all treatment parts relevant for the respective patient, such as the vacuum pad 70, it can be ensured that false treatment or any confusion of treatment components is excluded. Moreover, the system can already when the patient enters the room detect his identity by means of the identifiers that are stored in RFID-markers provided on the identification marks, and based thereupon, the proper treatment parameters for the patient, such as the position of the gantry, radiation dose, aperture settings and the like, can be set in a non-confusable manner.

Hereafter, repositioning of the patient and the treatment components is performed by the operator staff using the virtual representation displayed by the display device 37 including the target and the actual positions of essential identification marks and optionally a superimposition of a live video image over a video image recorded during the set-up. In addition, the system can, based on the displacement vectors which can be determined using the actual and target positions, also perform automated repositioning of the patient. Once all target and actual positions of the identification marks "match", the system displays this and the treatment can commence.

If the system detects incorrect repositioning of the patient, because "no match" between the target and the actual position of at least one identification mark was detected, then the system shall not release an interlock for commencement of the treatment. It is equally possible that upon detection of a "no match" between the target and the actual position of at least one identification mark during the treatment, for example, due to movement of the patient, immediate interruption of the irradiation is effected, and on the basis of one or more displacement vectors which can be continuously determined also during treatment using the actual and target positions, automated repositioning of the patient is performed before the irradiation is continued.

Ultimately, it is also possible, to continuously determine displacement vectors during the treatment, for example, for the identification marks disposed on the patient, and thereby, for example, following a motion of a tumor in the chest area caused by the patient's breathing, to achieve dynamic relocation of the patient's position by means of the actuators 39. This would create a situation in which the isocenter of the radiation is always in the tumor and therefore maximum treatment success with minimal damage to healthy tissue is achieved, even under the difficult conditions of a non-stationary tumor position.

Also in the case of application illustrated, a mobile data processing means—not shown—can in addition to the display device be used in addition to the data processing means 35. The mobile data processing means receives from the data processing means 35 the virtual representation for display.

By storing a plurality of data records of target positions for the treatment of a patient who, for example, has multiple tumors, entire treatment protocols can by means of the system according to the invention be processed for a patient in a single session by "running through" predetermined trajectories, so that, for example, in a first treatment step, irradiation of a first carcinoma is performed in a first position of the patient at a first predetermined angle of inclination of the gantry 60 using a first dose and for a first duration, and thereafter, there can be an interruption of the irradiation and automatic repositioning of the patient to a second position and a rotation of the position of the gantry 60 to a second predetermined angle of inclination, after which a further treatment of a second carcinoma with a second dose and for a second duration may take place. Other treatments with respective interposed automatic "repositioning movements" are of course also possible, where each of the treatment sessions can be executed on the basis of a completely unique set of treatment parameters.

The present invention has been described above both generally and thereafter with reference to a preferred embodiment and situation of application with their individual features. All of the features described can be combined almost arbitrarily, where there is a possible restriction only by the respective situation of application and the embodiment related thereto. However, it is expressly pointed out that any combination of features, as described above is possible and within the scope of the description of the invention is also to be considered disclosed as explicitly belonging to it.

The invention claimed is:

1. System for detecting the identifier and the position of at least one identification mark comprising:

at least one first optical recording device being adapted such that, by means of said first optical recording device, the spatial position of at least one identification mark being arranged inside the measurement volume of said first optical recording device can be detected;

at least one data processing means, being at least indirectly connected to said first recording device and receiving information therefrom about the spatial position of said detected identification mark;

at least one second optical recording device being adapted such that, by means of said second optical recording device, a plan projection of at least part of the measurement volume of said first optical recording device can be scanned in a spatially resolved manner; where said at least one data processing means is at least indirectly connected to said second optical recording device and receives spatially resolved information therefrom about said scanned projection; and where said at least one data processing means has transformation information available that allows the definition of a region of interest (ROI) in the spatially resolved information regarding said scanned projection, where said ROI are searched for the presence and the type of identifier information in order to determine therefrom the identifier of said detected identification mark characterized in that a data structure is provided in a first memory device connected to said at least one data processing means and at least partially comprises a virtual representation of said space spanned by said measurement volume of said first optical recording device, where said virtual representation comprises information about the target position of at least one identification mark as well as at least one associated identifier; and said at least one data processing means performs a comparison between said actual position of an identification mark and said target position of an identification mark within said virtual representation, as well as a comparison of the determined identifier of said detected identification mark and the identifier of said corresponding identification mark stored within said data structure;

and as a result of said comparison outputs a signal representing a "match" or "no match".

2. System according to claim 1, characterized in that at least one first optical recording device is a stereoscopic camera operating in the infrared spectral range, and said at least one second optical recording device is a CCD or CMOS camera operating in the visible spectral range.

3. System according to claim 1, characterized in that said transformation information is adapted such that, due to the application of said transformation information to said information regarding said spatial position of an identification mark, a localization of the same identification mark occurs in said plan projection, where, based on said localization, the definition of said ROI is performed in said spatially resolved information regarding said scanned projection.

4. System according to claim 1, characterized in that said at least one data processing means is mobile, is in particular a portable data processing means and preferably a portable computer (laptop), a tablet computer, or any type of devices.

5. System according to claim 1, characterized in that said at least one data processing means comprises a plurality of interacting data processing means, where data communication between said plurality of data processing means is effected preferably by means of optical, radio or wireless data connections.

6. System according to claim 1, characterized in that said actual position of said at least one detected identification mark, said target position and/or location of said corresponding at least one identification mark, and/or said virtual representation are graphically outputted via a display device connected at least indirectly to said at least one data processing means.

7. System according to claim 1, characterized in that said virtual representation comprises information on the required accuracy of said position match of said at least one identification mark, and in particular, in connection with said target position of at least one identification mark with respectively predefined identifier, the information on the required accuracy of said position match between said target and actual position of said identification mark is specified.

8. System according to claim 7, characterized in that said data processing means, as a result of said comparison of said target to said actual position-of said at least one identification mark, outputs a signal representing a "match" or "no match" for further processing, if said actual position of said at least one identification mark matches the target position in said respective identification mark of said virtual representation within the scope of said required accuracy specified.

9. System according to claim 1, characterized in that, in the event that said data processing means as a result of said comparison of said target to said actual position of said at least one identification mark, outputs a signal for further processing representing "no match", a displacement vector is formed within said virtual representation between said actual position and said target position of said at least one identification mark and displayed by said display device of said data processing means and/or serves as a basis for controlling at least one actuating element in order to guide said at the least one identification mark into its target position.

10. System according to claim 1, characterized in that said comparison result is at least in part outputted in the form of a color-coded visual output, including a green field or a green dot, or a red field or a red dot, respectively, by outputting text result messages, such as "OK" or "FAIL", respectively, by outputting speech and/or by releasing or blocking at least one interlock, preferably at least one software interlock, when said data processing means outputs a signal representing a "match" or "no match", respectively, as said comparison result.

11. System according to claim 1, characterized in that said at least one data processing means comprises at least one external and/or integrated image recording device, where said image recording device preferably comprises a video camera, and particularly preferably a high-resolution video camera.

12. System according to claim 11, characterized in that said at least one image recording device is said second optical recording device.

13. System according to claim 11, characterized in that at least one image recorded by said external and/or integrated image recording device is stored in said memory device together with or in connection to said virtual representation, where said image is preferably prior to being stored subjected to image processing, in particular contrast enhancement, segmentation, edge detection, and subtraction.

14. System according to claim 11, characterized in that superimposition of said image and/or text output of said comparison result and/or of said stored image occurs with said image recorded by said image recording device and this superimposed image is outputted by means of said display device of said at least one data processing means.

15. System according to claim 1, characterized in that said transformation information is continuously adapted on the basis of the position and/or orientation of said second optical recording device relative to said measurement volume of said first optical recording device, in particular when said second optical recording device is integrated into said mobile data processing means.

16. System according to claim 1, characterized in that said transformation information is generated and/or calibrated by at least once determining said position and/or location and said identifier of at least one identification mark by said first optical recording device or said second optical recording device, respectively, and relating said position and/or location information to said information regarding the localization of said identifier within said plan projection.

17. System according to claim 1, characterized in that a projection of 3D-information occurs in said display area of said display device of said at least one data processing means and in particular a projection of 3D-information, such as spatial position and/or location information as well as information regarding said virtual representation according to the ray-tracing technology, in said display area of said display device of said at least one data processing means while considering the perspective of the viewer of said display device.

18. Method for controlling the positioning of a plurality of identification marks relative to each other and/or absolute within said virtual representation, where said identification marks are arranged in particular on and/or in one or more objects and/or humans, and wherein said method uses a system for detecting the identifier and the position-of at least one identification mark comprising:

at least one first optical recording device being adapted such that, by means of said first optical recording device, the spatial position of at least one identification mark being arranged inside the measurement volume of said first optical recording device can be detected;

at least one data processing means, being at least indirectly connected to said first recording device and receiving information therefrom about the spatial position of said detected identification mark;

at least one second optical recording device being adapted such that, by means of said second optical recording device, a plan projection of at least part of the measurement volume of said first optical recording device can be scanned in a spatially resolved manner; where said at least one data processing means is at least indirectly connected to said second optical recording device and receives spatially resolved information therefrom about said scanned projection; and where said at least one data processing means has transformation information available that allows the definition of a region of interest (ROI) in the spatially resolved information regarding said scanned projection, where said ROI are searched for the presence and the type of identifier information in order to determine therefrom the identifier of said detected identification mark characterized in that a data structure is provided in a first memory device connected to said at least one data processing means and at least partially comprises a virtual representation of said space spanned by said measurement volume of said first optical recording device, where said virtual representation comprises information about the target position of at least one identification mark as well as at least one associated identifier; and said at least one data processing means performs a comparison between said actual position of an identification mark and said target position of an identification mark within said virtual representation, as well as a comparison of the determined identifier of said detected identification mark and the identifier of said corresponding identification mark stored within said data structure;

and as a result of said comparison outputs a signal representing a "match" or "no match".

19. Method according to claim 18 wherein the method is for re-establishing the arrangement of identification marks after loss of said relative positioning to each other and/or said absolute positioning in relation to said virtual representation, in particular for re-positioning a human and/or objects relative to a human.

* * * * *